Oct. 15, 1935.    C. C. FARMER    2,017,792
FLUID PRESSURE BRAKE
Original Filed Aug. 1, 1931    2 Sheets-Sheet 1
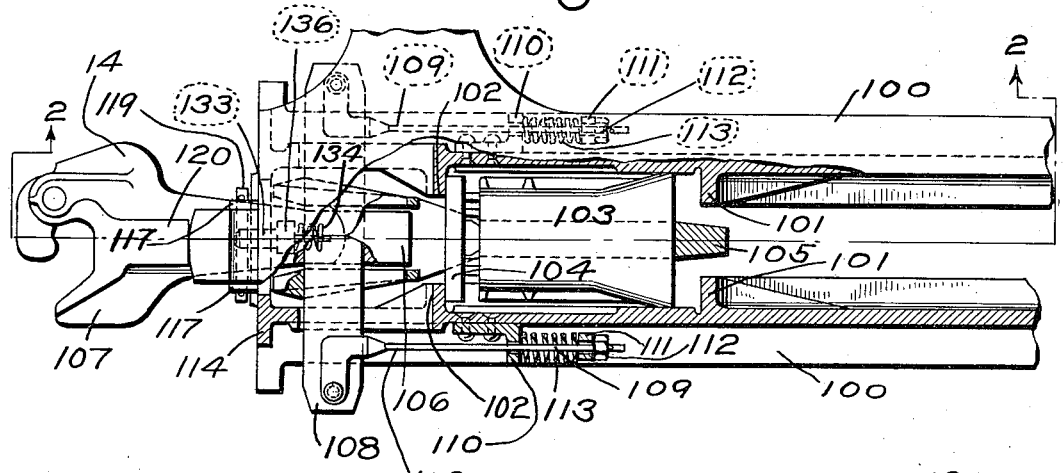
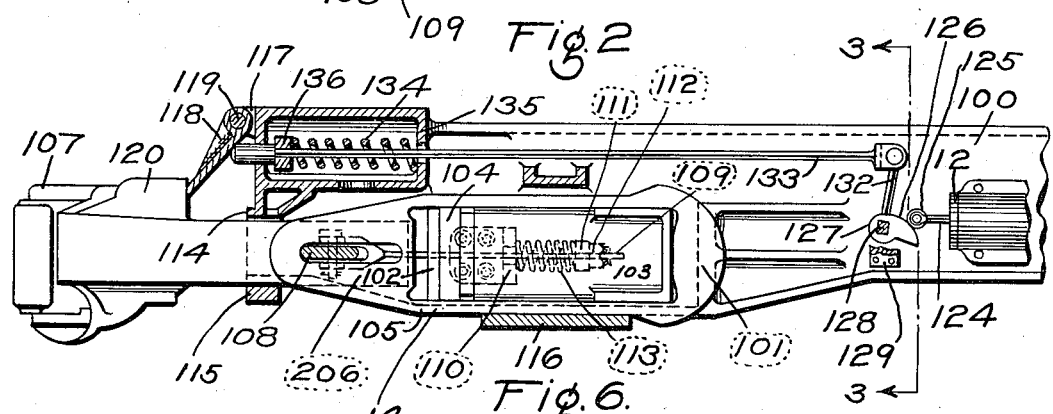
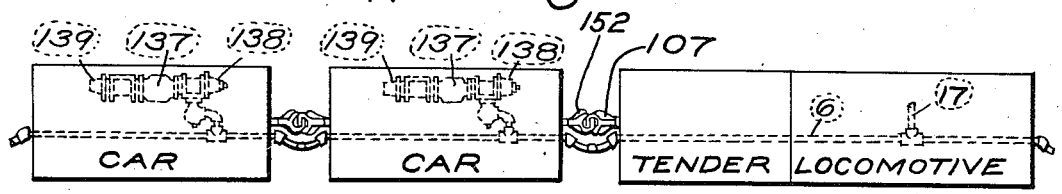
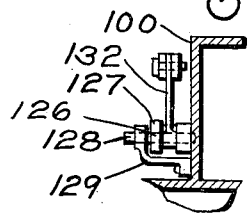
INVENTOR.
CLYDE C. FARMER
By *Wm. M. Cady*
ATTORNEY.

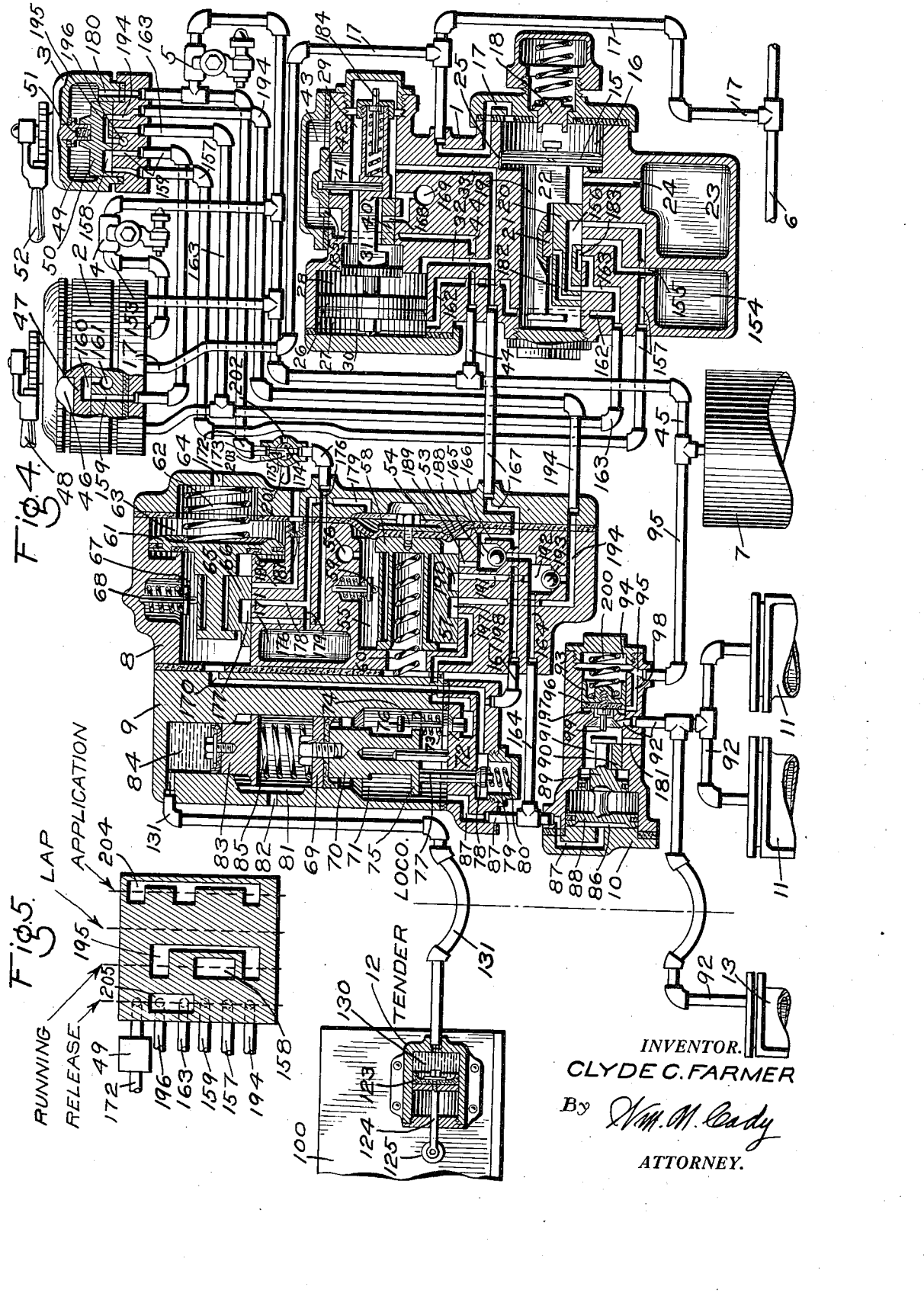

Patented Oct. 15, 1935

2,017,792

UNITED STATES PATENT OFFICE 2,017,792

FLUID PRESSURE BRAKE

Clyde C. Farmer, Pittsburgh, Pa., assignor to The Westinghouse Air Brake Company, Wilmerding, Pa., a corporation of Pennsylvania Application August 1, 1931, Serial No. 554,426
Renewed October 21, 1933

36 Claims. (Cl. 303—35)

This invention relates to brake systems for trains and more particularly to fluid pressure brake systems adapted for the handling of long trains.

It is well known that when the usual brake valve device of a fluid pressure brake system on a train is turned to a brake application position, the brakes apply serially from the front end of the train toward the rear of the train, that is to say, the locomotive and tender brakes will apply first and then the brakes on the following cars will apply serially toward the rear end of the train. As a result of this serial braking action, the retardation of the locomotive, tender and cars at the front end of the train begins before the brakes on the cars at the rear end of the train become effective.

There is a certain amount of slack or lost motion in the usual coupling mechanisms between the adjacent ends of adjacent cars of a train, and by reason of the fact, as above explained, that the locomotive, tender and cars at the front end of the train begin to decelerate before the cars at the rear end of the train, if this slack is stretched out at the time an application of the brakes is initiated, the rear cars of the train run in against the slower moving cars and tender at the front end of the train tending to cause shocks.

Since the locomotive and tender brakes apply first when an application of the brakes is initiated, the locomotive and tender act to impede the forward movement of the cars of the train and due to this, increase the magnitude of any shocks which may be caused by the gathering of the slack in the train, to such an extent that damage or derailment of some of the cars of the train may result.

The principal object of my invention is to provide an improved brake system for a train which, when an application of the brakes is initated, will function to so control the locomotive and tender brakes that the locomotive and tender will not act to decelerate the cars of the train during the period of time in which the slack in the train is gathering.

Another object of my invention is to provide an improved train brake system which, after an application of the brakes is initiated, functions for a predetermined period of time to automatically vary the braking force of the locomotive and tender brakes and then, after said predetermined period of time has elapsed, functions automatically to effect the application of the locomotive and tender brakes with full force.

Another object is to provide a brake system for a train which, in functioning to effect an application of the brakes, controls the braking action on the locomotive and tender for a predetermined period of time according to relative longitudinal movement between two vehicles or units of the train, and then controls the braking action regardless of relative longitudinal movement between the vehicles.

A further object is to provide a train brake system embodying means operative automatically for a predetermined period of time for increasing and decreasing the braking force on a front vehicle of the train according to relative longitudinal movement between said vehicle and an adjacent vehicle coupled thereto, and operative automatically, after said predetermined period of time has elapsed, to apply the brakes on the front vehicle with full force.

Other objects and advantages will appear in the following more detailed description of the invention.

In the accompanying drawings: Fig. 1 is a plan view, partly in section, of a portion of the tender of a locomotive and embodying a portion of my invention, the coupling mechanism being shown under heavy draft strain; Fig. 2 is a sectional view of the same taken on the line 2—2 of Fig. 1, some of the parts being shown in side elevation to more clearly illustrate certain details; Fig. 3 is a cross sectional view through one of the draft sills, taken on the line 3—3 of Fig. 2; Fig. 4 is a diagrammatic view, mainly in section, of the portion of the brake system carried by the locomotive; Fig. 5 is a development view of the independent brake valve device of the system; and Fig. 6 is a diagrammatic view of a train comprising a locomotive and tender and two cars, only a portion of the train brake system being shown.

As shown in Fig. 4 of the drawings, the locomotive equipment may comprise a distributing valve device 1, an automatic brake valve device 2, an independent brake valve device 3, a feed valve device 4, a reducing valve device 5, a brake pipe 6, a main reservoir 7, a timing valve device 8, a regulating valve device 9, a relay valve device 10 and brake cylinders 11.

The tender equipment, as shown in Figs. 2 and 4 may comprise a controlling device 12, a brake cylinder 13 and a coupling mechanism 14. As will hereinafter more fully appear, the operation of the controlling device 12 is controlled by the operation of the coupling mechanism 14 and is adapted to control the operation of the regulating valve device 9 of the locomotive equipment.

The relay valve device 10 is for the purpose of controlling the pressure of fluid in the locomotive brake cylinders 11 and the tender brake cylinder 13 and is controlled, for a predetermined period of time after a brake application has been initiated, by the regulating valve device 9. The functions of the timing valve device 8 is to render the regulating valve device ineffective to control the operation of the relay valve device 10 to control brake cylinder pressure after the expiration of said predetermined period of time and to then cause said valve device 10 to be maintained in position to effect a full application of the brakes without control by the regulating valve device 9.

The distributing valve device 1 may be of the usual type comprising an application portion and an equalizing portion. The equalizing portion comprises a piston 15, at one side of which is a chamber 16 connected to the brake pipe 6 through a passage and pipe 17, said chamber containing a spring-pressed stop 18 which is adapted to engage the piston 15. At the other side of the piston 15 is a chamber 19 containing a main slide valve 20 and an auxiliary slide valve 21 which are adapted to be operated by the piston 15 through the medium of a stem 22. The valve chamber 19 is in constant communication with a pressure chamber 23 through a passage 24, and when the piston 15 is in brake releasing position, as shown in Fig. 4, is connected to the piston chamber 16 by way of a feed groove 25 around the piston.

The application portion of the distributing valve device comprises a piston 26, at one side of which is a chamber 27. At the other side of the piston 26 is a chamber 28 and a chamber 29, which chambers 28 and 29 are separated by a baffle piston 30 carried by the stem 31 of the piston. While chambers 28 and 29 are separated by the baffle piston 30, they are nevertheless connected by way of passages 32 and 33, the passage 32 being open to the chamber 28 and the passage 33 being open to the chamber 29. Contained in the chamber 29 is an exhaust slide valve 40 which is adapted to be operated by the piston 26 through the medium of the piston stem 31. Secured to and projecting upwardly from the piston stem 31 is a pin 41 which operatively engages a slide valve 42 contained in a chamber 43 which is connected to the main reservoir 7 through a passage and pipe 44 and a main reservoir pipe 45.

The automatic brake valve device 2 is of the usual type and comprises a casing having a chamber 46 containing a rotary valve 47 which is adapted to be rotated to its various controlling positions by means of a handle 48. This brake valve device also comprises an equalizing piston which is adapted to operate a brake pipe discharge valve. Since the operation of the equalizing piston is well known it is deemed unnecessary to show it or the discharge valve.

The independent brake valve device 3 may be of the usual type and comprises a casing having a chamber 49 containing a rotary valve 50 having a stem 51 to which an operating handle 52 is operatively connected.

The timing valve device 8 comprises a cut-out portion which is adapted to operate to render the regulating valve device 9 ineffective to control the operation of the relay valve device at a predetermined time after an application of the brakes is initiated and also comprises a timing portion which operates to time the action of said cut-out portion. As shown in Fig. 2 both the cut-out portion and the timing portion are mounted in a single casing.

The cut-out portion of the device 8 may comprise a flexible diaphragm 53 which is mounted in the casing. At one side of the diaphragm is a chamber 54 and at the other side thereof is a chamber 55 which is constantly open to the atmosphere through a passage 56. Contained in the chamber 55 is a slide valve 57 which is adapted to be operated by a stem 58 secured to the diaphragm, said slide valve being held on its seat by a spring pressed plunger 59 which engages the back of the slide valve. Interposed between and engaging the casing and the stem 58 is a coil spring 60 which at all times exerts outward pressure on the stem and tends to move the stem and diaphragm in the direction toward the right hand.

The timing portion may comprise a piston 61 which is subject on one side to the pressure of a coil spring 62 contained in a chamber 63 which is open to the atmosphere through a port 64. The piston is provided with a stem 65 which is adapted to operate a slide valve 66 contained in a chamber 67, which slide valve is urged against its seat by a spring pressed plunger 68.

The regulating valve device 9 may comprise a casing in which a piston 69 is operatively mounted, said piston having a stem 70 which is contained in a chamber 71 at one side of the piston. Contained in the chamber 71 is a release valve 72 which is urged toward its seat by the action of a coil spring 73 which is interposed between the end of the piston stem and the valve. The valve 72 is provided with a stem 74 which extends through an opening in a flange 75 of the stem, and at its end is provided with a head 76 with which the piston stem engages to unseat the valve. The piston stem is adapted to engage the end of a fluted stem 77 of a fluid pressure supply valve 78 which is contained in a chamber 79 and which is urged toward its seat by the action of a coil spring 80.

At the other side of the piston is a chamber 81 which is open to the atmosphere through a port 82. Movably mounted in the casing is plunger piston 83 which is subject on one side to the pressure of a liquid contained in a chamber 84 in the casing. Contained in the chamber 81 and interposed between and engaging the pistons 69 and 83 is a coil spring 85 which is for the purpose of controlling the operation of the piston 69.

The relay valve device 10 may comprise a casing having a chamber 86 connected to the chamber 71 in the regulating valve device 9 by way of passages and pipe 87. Contained in chamber 86 is a piston 88 having a stem 89 adapted to operate a slide valve 90 contained in a chamber 91 which is constantly connected to the locomotive brake cylinders 11 and the tender brake cylinder 13 through a passage and pipes 92. Mounted in the casing is a piston valve 93 which is subject on one side to the pressure of a coil spring 200 contained in a chamber 94 and also to the pressure of fluid supplied from the main reservoir 7 to the chamber 94 through a pipe and passage 95. The piston valve is provided with a valve 96 which is adapted to seat on a seat rib 97 formed in the casing, the outer seated area of the valve being connected to the passage 95 through a passage 98. The piston valve is also provided with projection 99 which extends into the valve chamber 91 and is there adapted to be operatively engaged by the end of the piston stem 89.

As shown in Figs. 1 and 2 the coupling mechanism of the tender may comprise spaced draft sills 100 having rear stop lugs 101 and front stop lugs 102, and may also comprise a shock absorbing mechanism 103 which is interposed between the draft sills. The rear end of the shock absorbing mechanism is adapted to abut against the rear stop lugs 101 and the forward end abuts a follower plate 104 which in turn is adapted to abut the front stop lugs 102. The shock absorbing mechanism is surrounded by a yoke 105 to the forward end of which yoke the coupler shank 106 of a coupler 107 is secured by a draft key 108 which extends transversely of the tender through openings formed in the draft sills, yoke and coupler shank, the openings in the draft sills and the yoke being elongated in direction of the length of the tender to provide for the proper operation of the several movable parts of the draft rigging.

Secured to each end of the draft key 108 and extending rearwardly therefrom is a rod 109 which passes through a lug 110 secured to the outside of a draft sill 100. The rear end of this rod is provided with a follower plate 111 and a nut 112 which engages the follower plate and which has screw threaded connection with the rod. Interposed between and engaging the lug 110 and the follower plate 111 is a spring 113. The springs 113 are of such value that, when the draft rigging is fully released, they will, through the medium of the rods 109 and draft key 108, maintain the end of the coupler shank 106 in engagement with the follower plate 104, as shown in Figs. 1 and 2. It will here be understood that the force of the springs 113 is not sufficient to compress the shock absorbing mechanism 103 or to materially affect the capacity of the shock absorbing mechanism.

At the end of the draft sills a striking plate 114 is provided which, in the present embodiment of the invention, is integral with the draft sills.

The coupler shank 106 is supported in the usual manner by a carry iron 115 which may be integral with or removably secured to the bottoms of the draft sills. The shock absorbing mechanism 103 and yoke 105 are supported in the usual manner by a plate 116 which is secured to the bottoms of the draft sills.

Above the coupler 107, the striking plate 114 is provided with outwardly extending spaced lugs 117 between which a member 118 is pivotally mounted on a pin 119 carried by the lugs to swing toward and away from the striking plate 114. This member extends some distance below the pin 119 and its lower edge portion is adapted to be engaged by the rear face of the usual coupler horn 120. The portion of the member which is adapted to be engaged by the coupler horn is curved, as shown in Fig. 1, so that when the coupler moves sidewise in rounding a curve, the member will not be moved from its proper adjusted position by the coupler horn.

The controlling device 12 of the tender equipment may comprise a cylinder which is secured to one of the draft sills, and contains a plunger piston 123 having a stem 124 extending through the non-pressure head of the casing. The outer end of this stem is provided with a roller 125 which is constantly in engagement with the cam surface 126 of a cam 127 secured to a shaft 128 rotatably mounted in one of the draft sills and in a bracket 129 secured to the sill. At one side of the plunger piston is a chamber 130 which is connected to the chamber 84 in the regulating valve device 9 of the locomotive equipment through a pipe 131. The chambers 84 and 130 and the pipe connection 131 are filled with liquid.

The cam 127 when rotated in a counter-clockwise direction forces the plunger piston 123 inwardly which in turn forces liquid from the chamber 130 and pipe 131 into the chamber 84, the liquid thus forced in the chamber 84 causing the regulating plunger piston 83 to move inwardly compressing the regulating spring 85. When the cam is rotated in the opposite direction, its pressure on the plunger piston 123 is relieved and consequently the pressure transmitted to the regulating plunger piston 83 is also relieved. The regulating spring 85 will now act to move the regulating piston 83 outwardly and as the piston is thus moved it forces liquid from the chamber 84 and pipe connection 131 into the chamber 130, causing the control plunger piston 123 to move outwardly thus maintaining the roller 125 in engagement with the cam surface 126 of the cam.

For the purpose of rotating the cam 127 a mechanism is provided which comprises an operating arm 132 which is secured to the cam shaft 128 and which has its free end pivotally connected to the inner end of a plunger rod 133 slidably mounted on the draft sills 100. This rod extends longitudinally of the tender and its outer end portion extends through and beyond the striking plate 114 and is maintained in operative engagement with the rear surface of the member 118 by the action of a spring 134 interposed between and engaging an abutment 135 which may be integral with the draft sills and a collar 136 secured to the rod 133. It will here be noted that the position of the cam 127 is adapted to be varied through the operation of the member 118, rod 133, arm 132 and cam shaft 128.

Any desired type of brake equipment may be used on each car of the train. For illustrative purposes I have shown in outline in Fig. 6, each car equipped with the ordinary type of fluid pressure brake which comprises a brake pipe, an auxiliary reservoir 137, a triple valve device 138 and a brake cylinder 139.

The foregoing description has, for the greater part, been directed to the details of the several parts of the train brake system. The following description will be directed particularly to the operation of the system.

Assuming now that the coupler 107 at the rear end of the tender is coupled to the front coupler 152 of the first car of a train of coupler cars as shown in Fig. 6 of the drawings, and that the brake pipes of the locomotive, tender and cars are connected by the usual well known hose connections so as to form in effect a continuous brake pipe from end to end of the train, the equipment is charged with fluid under pressure as follows:—

Fluid under pressure supplied to the main reservoir 7 in the usual manner, flows therefrom through pipe 45 to the rotary valve chamber 46 in the automatic brake valve device 2, to the feed valve device 4 and to the reducing valve device 5. From the pipe 45 fluid under pressure also flows to the chamber 43 in the application portion of the distributing valve device 1 through pipe and passage 44. Fluid under pressure also flows from the main reservoir to the chamber 94 in the application valve device 10 through pipe and passage 95 and from passage 95 fluid flows to the outer seated area of the piston valve 96 through the passage 98, the pressure of the spring 200 and the pressure of fluid in chamber 94 yieldably maintaining the piston valve seated on the seat rib 97.

In charging the train brake system with fluid under pressure the rotary valve 50 of the independent brake valve device 3 is maintained in running position as shown in Fig. 4 and the rotary valve 47 of the automatic brake valve device 2 is first moved to release position in which fluid at main reservoir pressure is initially supplied to the brake pipe in the usual manner to provide for the rapid charging of the brake pipe and then after a predetermined period of time is moved to running position as shown in Fig. 4, in which latter position, fluid under pressure is supplied in the usual manner from the feed valve device 4 to the brake pipe 6 by way of a pipe 153, the brake valve device 2 and pipe 17.

With the brake valve device 2 in running position, the feed valve device 4 reduces the pressure of fluid from that carried in the main reservoir 7 to that normally carried in the brake pipe and since, as above described, fluid is supplied from the feed valve device to the brake pipe, the brake pipe throughout the length of the train as well as the chambers of the car equipments open thereto are finally charged with fluid supplied by the feed valve device in the usual well known manner.

Fluid at feed valve pressure supplied to the pipe 17 also flows to the equalizing piston chamber 16 in the distributing valve device 1, and with the equalizing piston 15 in its extreme left hand position, as shown in Fig. 4, fluid flows from the chamber 16 to the valve chamber 19 by way of the feed groove 25. Fluid thus supplied to the valve chamber 16 flows to the pressure chamber 23 through the passage 24. In this manner the equalizing piston chamber 16, valve chamber 19 and pressure chamber 23 are charged with fluid at brake pipe pressure.

With the equalizing piston 15 in its extreme left hand position, the slide valves 20 and 21, which are controlled by the piston, will also be in their extreme left hand position. With the slide valve 20 in this position, the usual application chamber 154 in the distributing valve device is connected to the atmosphere by way of a passage 155, a cavity 156 in the equalizing slide valve 20, a passage and pipe 157, a cavity 158 in the rotary valve 50 of the independent brake valve device 3, passages and pipe 159, a cavity 160 in the rotary valve 47 of the automatic brake valve device 2 and a passage 161.

The piston chamber 27 in the application portion of the distributing valve device is connected to the passage 157 through a passage 162, a passage 163 and cavity 156 in the equalizing slide valve 20 and is consequently open to the atmosphere.

With the piston 26 and slide valve 40 in release position, the piston chamber 86 in the relay valve device 10 is connected to the atmosphere by way of passage and pipe 87, a pipe and passage 164, past a ball check valve 165, a passage 166, a passage and pipe 167, a passage 33, valve chamber 29 in the application portion of the distributing valve device, a port 168 in the slide valve 40 and a passage 169.

With the piston 88 and slide valve 90 of the relay valve device in their extreme left hand position as shown in Fig. 4, the locomotive brake cylinders 11 and tender brake cylinder 13 are connected to the atmosphere through pipes and passage 92, valve chamber 91 containing the valve 90 and a passage 181.

The valve chamber 67 in the timing portion of the timing valve device 8 is connected to the pipe 167 and consequently to the atmosphere by way of a passage 170. With the valve chamber 67 thus connected to the atmosphere, the pressure of the spring 62 maintains the piston 61 and the slide valve 66 which is controlled by the piston in their extreme left hand position as shown in Fig. 4. With the slide valve 66 in this position, fluid under pressure is supplied by the reducing valve device 5 to a timing chamber 171 by way of a pipe 172, a passage 173 in a rotatable plug valve 174 of a cut-out cock device 175, a pipe and passage 176, a cavity 177 in the slide valve 66, a passage 178 and a passage 179. Fluid supplied by the reducing valve device to the passage 179 also flows to the diaphragm chamber 54 causing the diaphragm 53 to flex and shift the stem 58 and slide valve 57 to their extreme left hand position against the opposing pressure of the spring 60 as shown in Fig. 4.

As the locomotive and tender are set in motion in starting the train, the shock absorbing mechanism 103, follower plate 104 and draft yoke 105 of the coupling mechanism of the tender will move forwardly, i. e., in a direction toward the right hand, with the draft sills 100 and relative to the coupler 107, coupler shank 106, and draft key 108, until such time as the portions of the yoke which define the front end of key slots engage the key 108. It will here be noted that as the initial movement of the draft sills, shock absorbing mechanism and draft yoke is taking place, the coupler, coupler shank and draft key will be held substantially stationary by the resistance offered by the cars coupled to the tender, and that the springs 113 will be compressed, the value of the springs, when thus compressed, being insufficient to impart movement to the first car of the train.

Now when the front edge of the draft key 108 is engaged by the portions of the draft yoke 105 which define the forward ends of the draft key slots and the forward movement of the tender is continued, the shock absorbing mechanism 103 will be compressed in the usual well known manner until such time as the cars of the train are in motion. While the shock absorbing mechanism is being compressed, the member 118 will be maintained in operative engagement with the rear surface of coupler horn 120 by the pressure of the spring 134. It will thus be seen that as the draft sills move forwardly relative to the coupler 107 the rods 133 remain substantially stationary and the inner end thereof forms a substantially stationary fulcrum for the upper end of the cam operating arm 132, so that forward movement of the draft sills causes the cam 127 to rotate in a counter-clockwise direction. The cam, as it is thus rotated, forces the control piston 123 inwardly which in turn forces some of the liquid in the control piston chamber 130 and pipe connection 131 into the chamber 84 in the regulating valve device 9. The pressure of the fluid in chamber 84 causes the plunger piston 83 to move inwardly compressing the regulating spring 85 and consequently increasing its pressure on the piston 69.

When the coupling mechanism of the tender is subjected to maximum draft strain, the positions of the draft sills and the coupler 107 relative to each other will be substantially as shown in Figs. 1 and 2 and the several parts of the cam mechanism, control device 12 and plunger piston 83 will have been operated to compress the regulating spring 85 so that the maximum pressure of the spring is exerted on one side of the piston 69.

With the train in motion, the coupling mechanism of the tender subjected to heavy draft strain and the brakes released, the several parts of the locomotive and tender equipments will be in the positions in which they are shown in Figs. 1, 2, 3 and 4.

When it is desired to effect a service application of the brakes on the train, the rotary valve 47 of the automatic brake valve device is turned from running position to service position to effect a reduction in brake pipe pressure at a service rate.

When a reduction in brake pipe pressure is thus effected at a service rate, the pressure of fluid in the equalizing piston chamber 16 in the distributing valve device reduces with the brake pipe pressure, so that the fluid under pressure in the valve chamber 19 and pressure chamber 23 causes the piston 15 to move in a direction toward the right hand from the position in which it is shown in Fig. 4 to service position, in which position the piston is brought to a stop by its engagement with the spring pressed stop 18. As the piston is moved toward service position, it first closes the feed groove 25 and through the medium of the stem 22 shifts the slide valve 21 relative to the slide valve 20 to uncover a port 182 in the slide valve 20, and then through the medium of the stem 22 shifts the slide valve 20 to service position in which the port 182 registers with one branch of the passage 163 and in which a cavity 183 connects another branch of the passage 163 to the passage 155 leading to the chamber 154. Fluid under pressure from the valve chamber 19 and pressure chamber 23 now flows to the piston chamber 27 in the application portion of the distributing valve device by way of port 182 and passages 162 and 163. From the passage 163 fluid under pressure flows to the chamber 154 by way of cavity 183 and passage 155, the chamber 154 being provided for the purpose of adding additional volume to the application piston chamber 27.

Fluid under pressure thus supplied to the application piston chamber 27 causes the piston 26 to move to its extreme right hand position compressing the usual graduating spring mechanism 184 carried by the piston stem 31. As the piston is thus moved, it shifts the slide valve 40, through the medium of the piston stem 31, toward the right hand, and through the medium of the stem 31 and pin 41, also shifts the slide valve 42 toward the right hand. With the piston in its extreme right hand position, the valve 40 laps the exhaust passage 169, and a port 185 in the slide valve 42 establishes communication between the valve chambers 43 and 29. Fluid under pressure supplied to the valve chamber 43 from the main reservoir 7 now flows through this communication to the valve chamber 29 and from thence flows to the piston chamber 86 in the relay valve device 10 through passage 33, pipes and passage 167, passage 170, supply valve chamber 79 in the regulating valve device 9, past the unseated supply valve 78 and its fluted stem 77, through chamber 71 and passages and pipe 87.

Fluid under pressure thus supplied to the piston chamber 86 moves the piston 88 toward the right hand causing the piston stem 89 to shift the slide valve to lap the atmospheric passage 181. After the passage 181 is thus lapped, continued movement of the piston 88 toward the right hand causes the piston stem 89 to engage the projection 99 and thereby move the piston valve 93, against the opposing pressure of the spring 200 and the pressure of fluid in chamber 94, unseating the valve 96. With the valve 96 thus unseated from its seat rib 97, fluid under pressure flows from the main reservoir 7 to the locomotive and tender brake cylinders 11 and 13 respectively by way of pipe 95, passage 98 in the valve device 10, valve chamber 91 and passage 10 and pipes 92, thus effecting an application of the locomotive and tender brakes.

When a service reduction in brake pipe pressure is effected as before described, the fluid pressure brake equipments on the cars of the train will operate in the usual manner to apply the car brakes.

When in effecting an application of the brakes of the train as above described, the rate of retardation of the locomotive and tender exceeds the rate of retardation of the cars, the first car of the train will tend to run in toward the rear end of the tender. When the first car does start to run in with respect to the tender, the shock absorbing mechanism operates to move the coupler 107 inwardly toward the rear end of the tender. As the coupler is thus moved, the coupler horn 120, with which the member 118 is in engagement, rocks the member in a counter-clockwise direction about the pin 119, causing the rod 133 to move inwardly relative to the fixed parts of the tender, compressing the spring 134 and rocking the arm 132 and consequently the cam shaft 128 and cam 127 in a clockwise direction.

As the cam 127 is thus being rocked, its pressure on the piston 123 of the control device 12, as transmitted through the medium of the roller 125 and stem 124, is relieved, so that the regulating spring 85 now acts to force the plunger piston 83 outwardly displacing some of the liquid from the chamber 84 and pipe connection 131 into the chamber 130 of the control device, causing the piston 123 to move to maintain the roller 125 in operative contact with the surface 126 of the cam 127. As the plunger piston 83 thus moves the regulating spring 85 expands so that its pressure on the piston 69 is decreased.

When the regulating spring pressure thus decreases on one side of the piston 69, fluid under pressure in the chamber 71 at the other side of the piston causes the piston to move outwardly against the adjusted opposing pressure of the spring. As the piston is thus being moved, the stem 70 thereof moves out of engagement with the stem 77 of the supply valve 78 permitting the spring 80 to act to seat said valve to close off the further supply of fluid under pressure from the distributing valve device 1 to the chamber 71 and piston chamber 86 in the relay valve device 10. After the supply valve 78 is seated, the piston stem 70 engages and unseats the exhaust valve 72.

With the valve 72 unseated, fluid under pressure flows from chamber 71 and connected piston chamber 86 in the relay valve device 10 to the atmosphere by way of a passage 197, a cavity 198 in the cutout slide valve 57, a passage and pipe 194, a cavity 195 in the rotary valve 50 of the independent brake valve device 3 and a passage 196.

When fluid under pressure is thus vented from the piston chamber 86, fluid under pressure in the valve chamber 91 moves the relay piston 88 to its extreme outer position as shown in Fig. 4. As the piston is being moved to this position, the stem 89 thereof is first moved out of engagement with the projection 99 of the piston valve 93, permitting the spring 200 to act to move the piston valve to seat the valve 96, after which the slide valve 90, which is shifted by the stem 89, uncovers the passage 181 which is open to the atmosphere.

With the valve 96 seated, the flow of fluid under pressure from the main reservoir 7 to the valve chamber 91 is closed off and with the passage 181 uncovered, fluid under pressure begins to flow from the brake cylinders 11 and 13 to the atmosphere by way of pipes and passages 92, relay valve chamber 91 and passage 181, thus initiating the release of the locomotive and tender brakes.

If, after the release of the locomotive and tender brakes is initiated, in the manner just described, the first car of the train continues to run in relative to the tender, the regulating spring pressure on the piston 69 will continue to reduce, and as a consequence the piston 69 will remain in its outer position so that fluid under pressure will continue to flow from the brake cylinders 11 and 13 to the atmosphere.

If, however, after the release of the locomotive and tender brakes is initiated in the manner above described, the locomotive and tender, due to their inertia, should start to move forwardly relative to the first car of the train, the cam 127 will be rotated in a counter-clockwise direction and through the medium of the control device 12, liquid in chamber 130, pipe connection 131, an chamber 84 and the regulating plunger piston 83, will effect an increase in the pressure of the regulating spring 85 on the regulating piston 69. The spring now acts to move the piston 69 inwardly, first seating the exhaust valve 72 and then unseating the supply valve 78. With the supply valve 78 again unseated the relay valve device 10 operates as before described to again supply fluid under pressure to the brake cylinders 11 and 13.

It has been found that the slack in a very long train gathers within a period of approximately fifteen seconds after the initiation of a brake application and it is during this period of time that the regulating valve device 9 is effective to control the brakes. After the train slack is gathered there is no longer any need to regulate the locomotive and tender brakes and they may be applied without respect to coupling mechanism conditions and it is for the purpose of rendering the regulating valve device 9 ineffective to control the locomotive and tender brakes that I have provided the timing valve device 8.

In the foregoing description I have detailed the operation of the several parts of the locomotive and tender equipments during the period of time in which the train slack is gathered and will now describe the operation of the timing valve device 8.

When the pressure of fluid supplied through passage 170 to the valve chamber 67 in the timing portion of the timing valve device 8, is increased to a predetermined degree, say for instance to twenty or thirty pounds, the opposing pressure of the spring 62 will be overcome and the timing piston will be caused to move to its extreme outer or right hand position, shifting the slide valve 66 to its timing position.

In its timing position, the slide valve 66 laps the passage 176, thus closing communication from the reducing valve device 5 to the timing chamber 171 and diaphragm chamber 54 of the cutout portion. Further, with the slide valve 66 in this position, the cavity 177 connects the passage 178 to a passage 186 which leads to the atmosphere, there being a choke plug 187 interposed in the passage 186 which is removably secured in the casing.

Fluid under pressure now flows from the timing chamber 171 and diaphragm chamber 54 to the atmosphere by way of passages 179 and 178, cavity 177 and passage 186, the size of the opening in the choke plug 187 determining the rate of flow of fluid from said chambers.

Now when the pressure of fluid in the diaphragm chamber 54 and timing chamber 171 acting on one side of the diaphragm 53 is reduced slightly below the pressure of the spring 60 on the opposite side of the diaphragm, the spring acts to shift the diaphragm stem 58 and thereby the slide valve 57 to their extreme outer or right hand position, the stem flexing the diaphragm 53 outwardly.

The slide valve 57, when in this position, closes the communication between the passages 197 and 194 and thus prevents the flow of fluid from the chambers 71 and 86 in the regulating valve device 9 and relay valve device 10 respectively, to the atmosphere. Further, with the slide valve 20 in this position, the passage 167, which is supplied with fluid under pressure from the main reservoir 7 by the application portion of the distributing valve device 1, is connected to the piston chamber 86 in the valve device 10 by way of passage 166, a chamber 188 containing the ball check valve 165, a passage 189, a cavity 190 in the slide valve 57, a passage 191, a chamber 192 containing a ball check valve 193, passage and pipe 164 and pipe and passage 87.

Now if the piston 88 and slide valve 90 are in release position as shown in Fig. 4 fluid under pressure supplied to the chamber 86 shifts the piston and slide valve to their extreme inner or application position and maintains them in this position regardless of any adjustment which may take place in the regulating valve device 9.

It will be noted that the ball check valve 193 closes communication from the valve chamber 192 to passage 194 which, when the independent brake valve device 3 is in running position as shown in Fig. 4, is open to the atmosphere by way of a cavity 195 in the rotary valve 50 of the brake valve device 3 and a passage 196, thus preventing the loss of fluid under pressure from the passage 167 and consequently from the piston chamber 86 in the valve device 10.

From the foregoing description it will be understood that the regulating valve device 9 is effective to control brake cylinder pressure for a predetermined period of time after which the timing valve device 8 operates to render the regulating valve device ineffective to control the locomotive and tender brakes and to complete the application of the brakes without regulation by the regulating valve device 9.

If, instead of effecting a continuous service reduction in brake pipe pressure, it is desired to split the total service reduction into two stages, commonly called a split reduction, the automatic brake valve device 2 is turned to service position and maintained in this position until a predetermined reduction in brake pipe pressure is effected, say for instance a reduction of seven pounds, and is then turned to lap position and maintained in this position until the slack in the train is gathered. The brake valve device 2 is then turned to service position and maintained in this position until an additional reduction in brake pipe pressure is effected, say for instance an additional reduction of eight pounds, after which the brake valve device is turned to lap position.

When the initial reduction in brake pipe pressure is initiated, the distributing valve device 1 and relay valve device 10 will operate as before described to supply fluid under pressure to the brake cylinders 11 and 13 and the regulating valve device will be effective to control the locomotive and tender brake cylinder pressure.

After the desired initial reduction in brake pipe pressure has been effected the brake valve device 2 is turned to lap position. Now when the pressure of fluid in the valve chamber 19 in the equalizing portion of the distributing valve device 1 is reduced, by flow to the piston chamber 26 in the application portion, slightly below brake pipe pressure present in piston chamber 16, the equalizing piston 15 is caused to move toward the left hand shifting the slide valve 21 relative to the valve 20 lapping the port 132 in the valve 20, thus closing off the further flow of fluid from the valve chamber 19 to the piston chamber 27. When the pressure of fluid in the valve chamber 29 of the application portion becomes substantially equal to the pressure of fluid in the piston chamber 27, the graduating spring mechanism 134 acts to move the piston stem 31 and piston toward the left hand. As the piston stem thus moves, it shifts the slide valve 42 to close communication from the valve chamber 43 to the valve chamber 29, thus closing off the further flow of fluid to the piston chamber 86 of the relay valve device 10. With the flow of fluid to the valve chamber 29 thus closed off, the several parts of the application portion will come to a stop in lap position. The slide valve 40 is moved by the stem 31 but is not moved a sufficient distance to uncover the atmospheric passage 169, so that fluid under pressure in the valve chamber 43 and in the piston chamber 86 of the valve device 10 cannot escape to the atmosphere.

Now when the pressure of fluid in the valve chamber 91 in the relay valve device 10 is substantially equal to the pressure of fluid in the piston chamber 86, the spring 200 acts to move the piston valve 93, piston 88, stem 89 and slide valve 90 toward the left hand until such time as the valve 96 seats against the seat rib 97 when the several moving parts of the device come to a stop in lap position. With the slide valve 90 in this position, it maintains the atmospheric passage 181 closed so that fluid under pressure supplied to the brake cylinders 11 and 13 cannot escape to the atmosphere.

When an initial reduction of approximately seven pounds in brake pipe pressure is effected at a service rate, the pressure of fluid supplied to the valve chamber 67 in the timing portion of the timing valve device 8 will be approximately ten pounds so that the pressure of the spring 62 will prevent the timing piston from moving from the position in which it is shown in Fig. 4 to its timing position, which results in the timing valve device remaining inactive until a further reduction in brake pipe pressure is effected.

With the timing valve device thus maintained inactive from the time the brake application is initiated until the second reduction in brake pipe pressure is effected, the regulating valve device 9 and relay valve device 10 are adapted to be operated according to the operations of the coupling mechanism of the tender to control the brake cylinder pressure on the locomotive and tender.

When an additional reduction of about eight pounds in brake pipe pressure is effected, the pressure of fluid in the valve chamber, acting on one side of the timing piston 61, will be increased to thirty-five or forty pounds and will overcome the pressure of the spring 62 and the piston will move to its extreme right hand or timing position shifting the slide valve 66 to its timing position. Now after a predetermined period of time has elapsed, which period is determined by the volume of the timing reservoir 171 and diaphragm chamber 54 and the rate at which the choke plug 187 permits the flow of fluid from the chambers to the atmosphere, the cut-out portion of the device will operate as before described to supply fluid under pressure to the piston chamber 86 of the relay valve device 10, independently of the regulating valve device 9, and cause the device 10 to function to supply fluid under pressure to the brake cylinders 11 and 13.

It will be understood that the cutout portion does not operate to render the regulating valve device 9 ineffective to regulate brake cylinder pressure until a predetermined period of time has elapsed after the initiation of the second reduction in brake pipe pressure, so that the brake cylinder pressure can be controlled to prevent damaging shocks which this second reduction in brake pipe pressure may tend to cause.

When it is desired to release the brakes the brake valve device 2 is moved in the usual manner to again supply fluid under pressure to the brake pipe 6 by way of pipe 17. Fluid under pressure supplied to the pipe 17, flows to the piston chamber 16 in the equalizing portion of the distributing valve device causing the equalizing piston 15 to move to its extreme left hand position shifting the slide valves 20 and 21 to release position as shown in Fig. 4 in which position, fluid under pressure is vented from the piston chamber 27 in the application portion to the atmosphere by way of passages 162 and 163, cavity 156 in the equalizing slide valve 20, passage and pipe 157, cavity 158 in the rotary valve 50 of the independent brake valve device 3, passage and pipe 159, cavity 160 in the rotary valve 47 of the automatic brake valve device 2 and passage 161.

With the application piston chamber 27 thus vented, fluid under pressure in the application valve chamber 29 causes the piston 26 to move to its extreme left hand or release position, shifting the slide valve 168 to uncover the passage 169. Fluid under pressure in the timing valve chamber 67 now escapes to the atmosphere by way of passage 170, pipe and passages 167, passage 33, valve chamber 29 in the application portion of the distributing valve device 1 and passage 169.

With the valve chamber 67 thus vented, the spring 62 acts to return the timing piston 61 and slide valve 66 to their extreme left hand position, in which the slide valve laps the passage 186 leading to the atmosphere and in which the cavity 177 in the slide valve connects the passage 176 to the passage 178, so that fluid under pressure, supplied to the passage 176 by the reducing valve device 5 again flows to the timing chamber 171 and to the diaphragm chamber 54 in the cutout portion of the valve device 8, thus recharging the chambers.

Fluid under pressure supplied to the diaphragm chamber 54 causes the diaphragm to flex toward the left hand against the opposing pressure of the spring 60, shifting the cut-out slide valve 57 to its extreme left hand position, in which position, the cavity 198 again establishes communication from the passage 197 to the passage 194. The slide valve, when in this position, again closes off communication from the passage 189 to the ball check valve chamber 192, and fluid under pressure is vented from the piston chamber 86 in the relay valve device 10 and the chamber 71 in the regulating valve device 9, by way of passage and pipe 87, pipe and passage 164, past the ball check valve 165, through ball check valve chamber 188, passage 166, passage and pipe 167, passage 33, valve chamber 29 in the distributing valve device 1 and passage 169. Fluid under pressure may also flow from the chamber 71 to the atmosphere past the unseated valve 78, valve chamber 79, passage 170 and passage and pipe 167.

With the piston chamber 86 in the relay valve device 10 connected to the atmosphere, fluid at brake cylinder pressure in valve chamber 91 causes the piston 88 to move to its extreme left hand position, shifting the slide valve to uncover the passage 181 leading to the atmosphere. Fluid under pressure from the brake cylinders 11 and 13 now flows to the atmosphere through pipes and passages 92, valve chamber 91 and passage 181, thus releasing the locomotive and tender brakes.

If the rotary valve 47 of the automatic brake valve device 2 is turned to emergency position, a sudden reduction in brake pipe pressure will be effected in the usual well known manner.

This sudden reduction in brake pipe pressure causes the several parts of the distributing valve device to operate to supply fluid under pressure to the supply valve chamber 79 in the regulating valve device 9 and to the timing valve chamber 67 in the timing valve device 8 in substantially the same manner as described in connection with a service application of the brakes. The regulating valve device 9, timing valve device 8 and relay valve device 10 will now function to control the locomotive and tender brake cylinder pressure in the same manner as before described in connection with a service application of the brakes.

On short trains where the train slack is negligible and is not liable to cause severe shocks when gathering, the regulating valve device 9 may be rendered ineffective to control the brake cylinder pressure on the locomotive and tender, and it is for this purpose that the cut-out cock device 175 is provided. When it is desired to render the regulating device 9 ineffective, the plug valve 174 of this cock device is rotated, through the medium of a handle 201, to a position in which the passage 173 registers with a port 202 open to the atmosphere and a passage 203 which is open to the passage 173 registers with the passage 176. With the plug valve in this position the timing chamber 171 and diaphragm chamber 54 in the timing valve device 8 is open to the atmosphere. Due to this, the pressure of the spring 60 maintains the cutout slide valve 57 in its extreme outer or cut-out position. Now when fluid under pressure is supplied to the passage 167, it will flow therefrom to the piston chamber 86 in the valve device 10 by way of passage 166, ball check valve chamber 188, passage 189, cavity 196 in the cut-out slide valve 57, passage 191, ball check valve chamber 192, passage and pipe 164, and passage and pipe 87 and the relay valve device 10 will be caused to operate to effect an application of the locomotive and tender brakes. It will thus be seen that with the cut-out cock in cut-out position the regulating valve device 9 is rendered ineffective to control the locomotive and tender brake cylinder pressure when an automatic application of the brakes is effected.

When it is desired to effect an application of the locomotive and tender brakes only, the rotary valve 50 of the independent brake valve device 3 is rotated to application position, in which position, a port 204 in the rotary valve connects the rotary valve chamber 49 to the passage and pipe 163 and to the passage and pipe 194. Fluid under pressure now flows from the reducing valve device 5 to the piston chamber 27 in the application portion of the distributing valve device 1 by way of pipe and passage 172, rotary valve chamber 49, port 204 in the rotary valve 50, pipe and passage 163, and passage 162. Fluid under pressure thus supplied to the piston chamber 27 causes the piston 26 to move to its extreme right hand position, shifting the slide valve 40 to close the communication from the valve chamber 29 to the passage 169 leading to the atmosphere.

Fluid under pressure supplied by the reducing valve device 5 also flows from the rotary valve chamber 49 in the rotary valve 50 to the piston chamber 86 of the relay valve device 10 by way of port 204 in the rotary valve pipe and passage 194, past the ball check valve 193, ball check valve chamber 192, passage and pipe 164 and pipe and passage 87. Fluid under pressure thus supplied to the piston chamber 86 causes the piston to move to its extreme right hand position shifting the slide valve 90 to lap the passage 181 leading to the atmosphere and then causing the piston valve 93 to operate to unseat the valve 96. With the valve unseated fluid under pressure flows from the main reservoir 7 to the brake cylinders 11 and 13 through pipe and passage 95, passage 98, valve chamber 91 in the valve device 10 and passage and pipes 92.

When the piston 26 of the application portion of the distributing valve device is moved to application position as just described, it causes the slide valve 42 to be shifted to its extreme right hand position, in which fluid under pressure from the valve chamber 43 is supplied to the valve chamber 29 by way of the port 185 in the slide valve.

When the pressure of fluid in valve chamber 29 becomes substantially equal to the pressure of fluid in the piston chamber 27 as supplied by the reducing valve device 5, the graduating spring mechanism 184 causes the piston 26 and stem 31 to move toward the left hand shifting the slide valve 42 to lap position in which the flow of fluid from the chamber 43 to the chamber 29 is closed off. When the piston 26 and stem 31 are in lap position the slide valve 40, which has been shifted through the medium of the stem 31, still maintains the atmospheric passage 169 closed.

Now when the brake cylinder pressure present in valve chamber 91 of the relay valve device 10 is substantially equal to the pressure of fluid supplied to the chamber 86, the pressure of the spring 200 causes the piston valve 93 to move to seat the valve 96, thus closing off the further flow of fluid to the brake cylinders 11 and 13.

It will be noted that when an application of the locomotive and tender brakes is effected through the manipulation of the independent brake valve device 3, the regulating valve device 9 and timing valve device 8 are ineffective to control the pressure of fluid in the brake cylinders 11 and 13.

To release the locomotive and tender brakes after an independent application has been effected as just described, the rotary valve 50 of the independent brake valve device 3 is turned to release position in which a cavity 205 connects the passage 163 to the passage 196 leading to the atmosphere thus venting fluid under pressure from the piston chamber 27 in the application portion of the distributing valve device 1.

With the chamber 27 thus vented, fluid under pressure in the valve chamber 29 causes the piston 26 to move to its extreme left hand position, shifting the slide valve 40 to release position in which the slide valve uncovers the passage 169. Fluid under pressure now flows from the piston chamber 86 in the relay valve device 10 to the atmosphere by way of passage and pipe 87, pipe and passage 164, past the ball check valve 165, valve chamber 168, passage 166, passage and pipe 167, passage 33, valve chamber 29 and passage 169. When the chamber 86 is thus vented the several movable parts of the relay valve device 10 operate as before described to vent fluid under pressure from the brake cylinders 11 and 13, thus effecting the release of the brakes.

It will be noted from the foregoing description that, when a brake pipe reduction is initiated to effect an application of the brakes, the regulating valve device 9 functions according to relative movement between the tender and the first car of the train to vary the locomotive and tender brake cylinder pressure in such a manner that the locomotive and tender will not act to retard the forward motion of the cars of the train during the train slack gathering period. After a period of time sufficient to permit the slack in the train to gather, the timing valve device 8 functions to render the regulating valve device 9 ineffective to control the brake cylinder pressure on the locomotive and tender and in so functioning causes the relay valve device 10 to operate to effect a full application of the brake without regulation.

It will be further noted that with the cut-out valve device 175 in cut-out position, the regulating valve device 9 is rendered ineffective to control the brake cylinder pressure on the locomotive and tender so that full brake cylinder pressure is obtained when the distributing valve device 1 and relay valve device 10 operate to application position to effect an unregulated application of the locomotive and tender brakes.

In this specification I have described my equipment as being carried by a locomotive and tender, but I do not wish to be limited to this for it will be readily understood that the equipment may be carried by any other train power unit not having a tender such as an electric locomotive, motor car or the like.

In my prior application, Serial No. 552,633, filed July 23, 1931, and application, Serial No. 685,576, filed August 17, 1933, which is in part a continuation of application Serial No. 552,633, claims are included covering broad subject matter disclosed in the present application and it is to be understood that the appended claims are intended to cover only the specific feature of automatically limiting the period of time over which the braking force on the head vehicle of the train is varied according to relative movement between said vehicle and first car of the train and for increasing the braking force without regulation according to relative movement between the vehicles, after said period of time has elapsed, which feature is not included in either of the two above identified applications.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination in a train of at least two vehicles, of a brake equipment on one of said vehicles, means operative according to a relative movement between said vehicles to effect a regulated application of the brakes on the vehicle, and means operative automatically at a predetermined time after an application of the brakes is initiated to effect an application of the brakes without regulation.

2. The combination in a train of at least two vehicles, of a brake equipment on one of said vehicles, means included in said equipment operative upon initiating an application of the brakes and according to a relative movement between said vehicles for varying the braking action of the equipment, and means operative automatically at a predetermined time after a brake application is initiated for rendering the first mentioned means ineffective to vary the braking action of the equipment.

3. In a brake system for a train of one or more cars and a power vehicle, the combination with a brake equipment, of means included in said equipment operative automatically in effecting an application of the brakes, according to a relative movement between the power vehicle and a car for varying the braking action of the equipment, and means also included in said equipment operative automatically at a predetermined time after an application of the brakes is initiated for rendering the first mentioned means ineffective to vary the braking action of the equipment.

4. The combination in a train of at least two vehicles, of a brake equipment on each of said vehicles, means for initiating the operation of the brake equipment on both of said vehicles to effect an application of the train brakes, means operated automatically upon a relative movement between said vehicles for regulating the braking action of the brake equipment on one of said vehicles, and means operated automatically at a predetermined time after the initiation of the operation of the vehicle brake equipments for rendering the second mentioned means ineffective to regulate the braking action on the vehicle.

5. The combination in a train of at least two vehicles, of a brake equipment on each of said vehicles, means for initiating the operation of the brake equipment on both of said vehicles to effect an application of the train brakes, means operated automatically upon a relative movement between said vehicles for increasing or decreasing the braking force of the equipment on one vehicle, and means operated automatically at a predetermined time after the initiation of the operation of the vehicle brake equipments for rendering the second mentioned means ineffective to regulate the braking action of the equipment on said vehicle.

6. The combination in a train of at least two vehicles, of a brake equipment on each of said vehicles, means for initiating the operation of the brake equipment on both of said vehicles to effect an application of the train brakes, means operated automatically upon a relative movement between said vehicles for increasing or decreasing the braking force of the equipment on one vehicle, and means operated automatically at a predetermined time after the initiation of the operation of the vehicle brake equipments for increasing the braking force of the equipment on said vehicle and for rendering the first mentioned means ineffective to vary the braking force of the equipment on said vehicle.

7. The combination in a train of at least two vehicles, of a brake equipment on one of said vehicles, means included in said equipment operative according to relative longitudinal movement between said vehicles to effect a regulated application of the brakes on the vehicle, and means operative automatically to limit the period of time in which the first mentioned means regulate the application of the brakes and to effect an application of the brakes without regulation.

8. The combination in a train of at least two vehicles, of means for coupling said vehicles to each other, the coupling means being movable longitudinally relative to at least one vehicle, a fluid pressure brake system operative to effect an application of the brakes on the train, and means operated upon relative movement between said coupling means and said vehicle for a predetermined time only for regulating the braking action of the portion of the system on said vehicle.

9. The combination in a train of at least two vehicles, of a brake equipment on one of said vehicles, means included in said equipment operative according to a relative movement between said vehicles to effect a regulated application of the brakes on the vehicle, means operative for rendering the first mentioned means ineffective to control the application of the brakes and to effect an application of the brakes without regulation according to relative movement between the vehicles, and means operative automatically regardless of the speed of the vehicle for timing the action of the second mentioned means for limiting the period of time over which the first mentioned means is operated to effect a regulated application of the brakes.

10. The combination in a train of at least two vehicles, of means for coupling said vehicles to each other, the coupling means being movable longitudinally relative to at least one vehicle, a fluid pressure brake system operative to effect an application of the brakes on the train, and means adjusted by said coupling means when the coupling means is moved longitudinally relative to said vehicle for controlling the braking action of the portion of the system on said vehicle, and means operated automatically at a predetermined time after an application of the brakes is initiated for rendering the second mentioned means ineffective to control the braking action of the portion of the equipment on said vehicle.

11. The combination in a train of at least two vehicles, one of which is a power vehicle, of a brake equipment on each of said vehicles, manually controlled means on the power vehicle for initiating the operation of the brake equipments on both of said vehicles to effect an application of the train brakes, and means operated automatically, for a predetermined period of time only, upon a relative movement between said vehicles for varying the braking action of the equipment on the power vehicle.

12. In a fluid pressure brake system for a train of one or more cars and a power vehicle, the combination with a brake pipe, of means on the car or cars of the train operated upon a reduction in brake pipe pressure for effecting an application of the car brakes, valve means on the power vehicle operated upon said reduction in brake pipe pressure to effect an application of the power vehicle brakes, valve mechanism operated according to a relative movement between the power vehicle and the adjacent car of the train for controlling the operation of said valve means to increase or decrease the braking force on the power vehicle, and means operative at a predetermined time after a predetermined reduction in brake pipe pressure is effected for rendering said valve mechanism ineffective to vary the braking force on the power vehicle.

13. In a fluid pressure brake system for a train of one or more cars and a power vehicle, the combination with a brake pipe, of means on the car or cars of the train operated upon a reduction in brake pipe pressure for effecting an application of the car brakes, valve means on the power vehicle operated upon said reduction in brake pipe pressure to effect an application of the power vehicle brakes, valve mechanism operated according to a relative movement between the power vehicle and the adjacent car of the train for controlling the operation of said valve means to increase or decrease the braking force on the power vehicle, and means operative at a predetermined time after said reduction in brake pipe pressure is initiated for rendering said valve mechanism ineffective to vary the braking force on the power vehicle.

14. In a fluid pressure brake system for a train of one or more cars and a power vehicle, the combination with a brake pipe, of means on the car or cars of the train operated upon a reduction in brake pipe pressure for effecting an application of the car brakes, valve means on the power vehicle operated upon said reduction in brake pipe pressure to effect an application of the power vehicle brakes, valve mechanism operated according to a relative movement between the power vehicle and the adjacent car of the train for controlling the operation of said valve means to increase or decrease the braking force on the power vehicle, and means operative at a predetermined time after a predetermined reduction in brake pipe pressure is effected for rendering said valve mechanism ineffective to vary the braking force on the power vehicle, and for effecting an increase in the braking force on the power vehicle.

15. In a fluid pressure brake system for a train of one or more cars and a power vehicle, the combination with a brake pipe, of means on the car or cars of the train operated upon a reduction in brake pipe pressure for effecting an application of the car brakes, valve means on the power vehicle operated upon said reduction in brake pipe pressure to effect an application of the power vehicle brakes, valve mechanism operated according to a relative movement between the power vehicle and the adjacent car of the train for controlling the operation of said valve means to increase or decrease the braking force on the power vehicle, and means operative at a predetermined time after said reduction in brake pipe pressure is initiated for rendering said valve mechanism ineffective to vary the braking force on the power vehicle, and for effecting an increase in the braking force on the power vehicle.

16. In a fluid pressure brake system for a train of one or more cars and a power vehicle, the combination with a brake pipe, of means on the car or cars of the train operated upon a reduction in brake pipe pressure for effecting an application of the car brakes, valve means on the power vehicle operated upon said reduction in brake pipe pressure to effect an application of the power vehicle brakes, valve mechanism operated according to a relative movement between the power vehicle and the adjacent car of the train for controlling the operation of said valve means to increase or decrease the braking force on the power vehicle, pressure sensitive means operative to render said valve mechanism ineffective to vary the braking force on the power vehicle, and means operated upon said reduction in brake pipe pressure for effecting the operation of said pressure sensitive means.

17. In a fluid pressure brake system for a train of one or more cars and a power vehicle, the combination with a brake pipe, of means on the car or cars of the train operated upon a reduction in brake pipe pressure for effecting an application of the car brakes, valve means on the power vehicle operated upon said reduction in brake pipe pressure to effect an application of the power vehicle brakes, valve mechanism operated according to a relative movement between the power vehicle and the adjacent car of the train for controlling the operation of said valve means to increase or decrease the braking force on the power vehicle, pressure sensitive means operative at a predetermined time after said brake pipe reduction is initiated to render said valve mechanism ineffective to vary the braking force on the power vehicle, and means operated upon said brake pipe reduction for effecting the operation of said pressure sensitive means.

18. In a fluid pressure brake system for a train of one or more cars and a power vehicle, the combination with a brake pipe, of means on the car or cars of the train operated upon a reduction in brake pipe pressure for effecting an application of the car brakes, valve means on the power vehicle operated upon said reduction in brake pipe pressure to effect an application of the power vehicle brakes, valve mechanism operated according to a relative movement between the power vehicle and the adjacent car of the train for controlling the operation of said valve means to increase or decrease the braking force on the power vehicle, pressure sensitive means operative at a predetermined time after said brake pipe reduction is initiated to render said valve mechanism ineffective to vary the braking force on the power vehicle, means operated upon the operation of said valve means for effecting the operation of said pressure sensitive means.

19. In a fluid pressure brake system for a train of one or more cars and a power vehicle, the combination with a brake pipe, of means on the car or cars of the train operated upon a reduction in brake pipe pressure for effecting an application of the car brakes, valve means on the power vehicle operated upon said reduction in brake pipe pressure to effect an application of the power vehicle brakes, valve mechanism operated according to a relative movement between the power vehicle and the adjacent car of the train for controlling the operation of said valve means to increase or decrease the braking force on the power vehicle, pressure sensitive means operative at a predetermined time after said brake pipe reduction is initiated to render said valve mechanism ineffective to vary the braking force on the power vehicle, means operated upon the initiation of an application of the brakes on the power vehicle for timing the action of said pressure sensitive means.

20. In a fluid pressure brake system for a train of one or more cars and a power vehicle, the combination with a brake pipe, of means on the car or cars of the train operated upon a reduction in brake pipe pressure for effecting an application of the car brakes, valve means on the power vehicle operated upon said reduction in brake pipe pressure to effect an application of the power vehicle brakes, valve mechanism operated according to a relative movement between the power vehicle and the adjacent car of the train for controlling the operation of said valve means to increase or decrease the braking force on the power vehicle, pressure sensitive means operative at a predetermined time after said brake pipe reduction is initiated to render said valve mechanism ineffective to vary the braking force on the power vehicle, and to effect an increase in the braking force on the power vehicle, and means operative to time the operation of said pressure sensitive means.

21. In a fluid pressure brake system for a train of one or more cars and a power vehicle, the combination with a brake pipe, of means on the car or cars of the train operated upon a reduction in brake pipe pressure for effecting an application of the car brakes, a distributing valve device operated upon said reduction in brake pipe pressure for supplying fluid under pressure to effect an application of the brakes on the power vehicle, a valve means operated according to a relative movement between the power vehicle and an adjacent car of the train for increasing or decreasing the braking force on the power vehicle, pressure sensitive means operative after said reduction in brake pipe pressure is initiated to render said valve means ineffective to vary the braking force on the power vehicle, and a valve mechanism operated by fluid under pressure supplied by said distributing valve device for controlling the operation of said pressure sensitive means.

22. In a fluid pressure brake system for a train of one or more cars and a power vehicle, the combination with a brake pipe, of means on the car or cars of the train operated upon a reduction in brake pipe pressure for effecting an application of the car brakes, a brake cylinder on the power vehicle, a valve device operative to one position to supply fluid under pressure to said brake cylinder and to another position to release fluid under pressure from the brake cylinder, a valve mechanism operated upon said reduction in brake pipe pressure for supplying fluid under pressure to operate said valve device to supply fluid under pressure to the brake cylinder, said valve device being operated upon the release of fluid under pressure supplied thereto by said valve mechanism for releasing fluid under pressure from the brake cylinder, means operated according to relative movement between the power vehicle and the adjacent car of the train for controlling the supply of fluid under pressure to and the release of fluid under pressure from said valve device, pressure sensitive means operative to render said valve device ineffective to control the flow of fluid under pressure to and from said brake cylinder, and valve means operated by fluid under pressure supplied by said valve mechanism for controlling the operation of said pressure sensitive means.

23. In a fluid pressure brake system for a train of one or more cars and a power vehicle, the combination with a brake pipe, of means on the car or cars of the train operated upon a reduction in brake pipe pressure for effecting an application of the car brakes, a brake cylinder on the power vehicle, a valve device operative to one position to supply fluid under pressure to said brake cylinder and to another position to release fluid under pressure from the brake cylinder, a valve mechanism operated upon said reduction in brake pipe pressure for supplying fluid under pressure to operate said valve device to supply fluid under pressure to the brake cylinder, said valve device being operated upon the release of fluid under pressure supplied thereto by said valve mechanism for releasing fluid under pressure from the brake cylinder, means operated according to relative movement between the power vehicle and the adjacent car of the train for controlling the supply of fluid under pressure to and the release of fluid under pressure from said valve device, pressure sensitive means operative to render said valve device ineffective to control the flow of fluid under pressure to and from said brake cylinder, and for establishing communication through which fluid under pressure supplied by said valve mechanism flows to said valve device, and valve means operated by fluid under pressure supplied by said valve mechanism to control the operation of said pressure sensitive means.

24. In a fluid pressure brake system for a train of one or more cars and a power vehicle, the combination with a brake pipe, of means on the car or cars of the train operated upon a reduction in brake pipe pressure for effecting an application of the car brakes, a brake cylinder on the power vehicle, a valve device operative to one position to supply fluid under pressure to said brake cylinder and to another position to release fluid under pressure from the brake cylinder, a valve mechanism operated upon said reduction in brake pipe pressure for supplying fluid under pressure to operate said valve device to supply fluid under pressure to the brake cylinder, said valve device being operated upon the release of fluid under pressure supplied thereto by said valve mechanism for releasing fluid under pressure from the brake cylinder, means operated according to relative movement between the power vehicle and the adjacent car of the train for controlling the supply of fluid under pressure to and the release of fluid under pressure from said valve device, pressure sensitive means operative to render said valve device ineffective to control the flow of fluid under pressure to and from said brake cylinder, and valve means subject to the opposing pressures of a spring and of fluid under pressure supplied from said valve mechanism for controlling the operation of said pressure sensitive means.

25. The combination in a train of at least two vehicles, of a brake equipment on one of said vehicles, means included in said equipment operative upon initiating an application of the brakes and according to a relative movement between said vehicles for varying the braking action of the equipment, means operative automatically at a predetermined time after a brake application is initiated for rendering the first mentioned means ineffective to vary the braking action of the equipment and means operative manually for selectively rendering the first mentioned means either effective or ineffective to vary the braking action of the equipment.

26. The combination in a train of at least two vehicles, of a brake equipment on each of said vehicles, means for initiating the operation of the brake equipment on both of said vehicles to effect an application of the train brakes, means operated automatically upon a relative movement between said vehicles for regulating the braking action of the brake equipment on one of said vehicles, means operated automatically at a predetermined time after the initiation of the operation of the vehicle brake equipments for rendering the second mentioned means ineffective to regulate the braking action on the vehicle, and a valve operative manually for selectively rendering the first mentioned means either effective or ineffective to regulate the braking action on the vehicle.

27. The combination in a train of at least two vehicles, of means for coupling said vehicles to each other, the coupling means being movable longitudinally relative to at least one vehicle, a fluid pressure brake system operative to effect an application of the brakes on the train, means operated upon relative movement between said coupling means and said vehicle for a predetermined time only for regulating the braking action of the portion of the system on said vehicle, and a valve operative manually for selectively rendering the first mentioned means either effective or ineffective to regulate the braking action of the portion of the equipment on said vehicle.

28. In a fluid pressure brake system for a train of one or more cars and a power vehicle, the combination with a brake pipe, of means on the car or cars of the train operated upon a reduction in brake pipe pressure for effecting an application of the car brakes, valve means on the power vehicle operated upon said reduction in brake pipe pressure to effect an application of the power vehicle brakes, valve mechanism operated according to a relative movement between the power vehicle and the adjacent car of the train for controlling the operation of said valve means to increase or decrease the braking force on the power vehicle, means operative at a predetermined time after a predetermined reduction in brake pipe pressure is effected for rendering said valve mechanism ineffective to vary the braking force on the power vehicle, and a valve operative manually for effecting the operation of said means to render said valve mechanism ineffective to vary the braking force on the power vehicle.

29. In a fluid pressure brake system for a train of one or more cars and a power vehicle, the combination with a brake pipe, of means on the car or cars of the train operated upon a reduction in brake pipe pressure for effecting an application of the car brakes, a brake cylinder on the power vehicle, a valve device operative to one position to supply fluid under pressure to said brake cylinder and to another position to release fluid under pressure from the brake cylinder, a valve mechanism operated upon said reduction in brake pipe pressure for supplying fluid under pressure to operate said valve device to supply fluid under pressure to the brake cylinder, said valve device being operated upon the release of fluid under pressure supplied thereto by said valve mechanism for releasing fluid under pressure from the brake cylinder, means operated according to relative movement between the power vehicle and the adjacent car of the train for controlling the supply of fluid under pressure to and the release of fluid under pressure from said valve device, a valve normally establishing communication through which fluid under pressure released from said valve device by said means flows, a movable abutment subject on one side to fluid under pressure for maintaining said valve in its normal position and operative upon the release of fluid under pressure for shifting said valve to close said communication and to establish another communication by passing said means and through which fluid under pressure is supplied to said valve device, pressure sensitive valve means operated by fluid under pressure supplied by said valve mechanism for releasing fluid under pressure from said abutment, and means for restricting the flow of fluid from said abutment.

30. In a fluid pressure brake system for a train of one or more cars and a power vehicle, the combination with a brake pipe, of means on the car or cars of the train operated upon a reduction in brake pipe pressure for effecting an application of the car brakes, a brake cylinder on the power vehicle, a valve device operative to one position to supply fluid under pressure to said brake cylinder and to another position to release fluid under pressure from the brake cylinder, a valve mechanism operated upon said reduction in brake pipe pressure for supplying fluid under pressure to operate said valve device to supply fluid under pressure to the brake cylinder, said valve device being operated upon the release of fluid under pressure supplied thereto by said valve mechanism for releasing fluid under pressure from the brake cylinder, means operated according to relative movement between the power vehicle and the adjacent car of the train for controlling the supply of fluid under pressure to and the release of fluid under pressure from said valve device, a valve normally establishing communication through which fluid under pressure released from said valve device by said means flows, a movable abutment subject on one side to fluid under pressure for maintaining said valve in its normal position and operative upon the release of fluid under pressure for shifting said valve to close said communication and to establish another communication by passing said means and through which fluid under pressure is supplied to said valve device, a timing valve normally establishing communication through which fluid under pressure is supplied to said side of said abutment and operative to establish a communication through which fluid under pressure is released from said side of said abutment, and means operated by fluid under pressure supplied by said valve mechanism for operating said timing valve.

31. In a fluid pressure brake system for a train of one or more cars and a power vehicle, the combination with a brake pipe, of means on the car or cars of the train operated upon a reduction in brake pipe pressure for effecting an application of the car brakes, a brake cylinder on the power vehicle, a valve device operative to one position to supply fluid under pressure to said brake cylinder and to another position to release fluid under pressure from the brake cylinder, a valve mechanism operated upon said reduction in brake pipe pressure for supplying fluid under pressure to operate said valve device to supply fluid under pressure to the brake cylinder, said valve device being operated upon the release of fluid under pressure supplied thereto by said valve mechanism for releasing fluid under pressure from the brake cylinder, means operated according to relative movement between the power vehicle and the adjacent car of the train for controlling the supply of fluid under pressure to and the release of fluid under pressure from said valve device, a valve normally establishing communication through which pressure released from said valve device by said means flows, a movable abutment subject on one side to fluid under pressure for maintaining said valve in its normal position and operative upon the release of fluid under pressure for shifting said valve to close said communication and to establish another communication by passing said means and through which fluid under pressure is supplied to said valve device, a timing valve normally establishing communication through which fluid under pressure is supplied to said side of said abutment and operative to establish a communication through which fluid under pressure is released from said side of said abutment, means operated by fluid under pressure supplied by said valve mechanism for operating said timing valve, and means governing the rate of flow of fluid under pressure from said side of said abutment.

32. In a fluid pressure brake system for a train of one or more cars and a power vehicle, the combination with a brake pipe, of means on the car or cars of the train operated upon a reduction in brake pipe pressure for effecting an application of the car brakes, a brake cylinder on the power vehicle, a valve device operative to one position to supply fluid under pressure to said brake cylinder and to another position to release fluid under pressure from the brake cylinder, a valve mechanism operated upon said reduction in brake pipe pressure for supplying fluid under pressure to operate said valve device to supply fluid under pressure to the brake cylinder, said valve device being operated upon the release of fluid under pressure supplied thereto by said valve mechanism for releasing fluid under pressure from the brake cylinder means operated according to relative movement between the power vehicle and the adjacent car of the train for controlling the supply of fluid under pressure to and the release of fluid under pressure from said valve device, a valve normally establishing communication through which fluid under pressure released from said valve device by said means, flows, a movable abutment subject on one side to fluid under pressure for maintaining said valve in its normal position and operative upon the release of fluid under pressure for shifting said valve to close said communication and to establish another communication by passing said means and through which fluid under pressure is supplied to said valve device, a timing reservoir, a timing valve normally establishing communication through which fluid under pressure is supplied to said side of said abutment and to said timing reservoir and operative to establish a communication through which fluid under pressure is released from said reservoir and said side of said abutment, means operated by fluid under pressure supplied by said valve mechanism to operate said timing valve, and means governing the rate of flow of fluid under pressure from said reservoir and said side of said abutment.

33. In a fluid pressure brake system for a train of one or more cars and a power vehicle, the combination with a brake pipe, of means on the car or cars of the train operated upon a reduction in brake pipe pressure for effecting an application of the car brakes, a brake cylinder on the power vehicle, a valve device operative to one position to supply fluid under pressure to said brake cylinder and to another position to release fluid under pressure from the brake cylinder, a valve mechanism operated upon said reduction in brake pipe pressure for supplying fluid under pressure to operate said valve device to supply fluid under pressure to the brake cylinder, said valve device being operated upon the release of fluid under pressure supplied thereto by said valve mechanism for releasing fluid under pressure from the brake cylinder, means operated according to relative movement between the power vehicle and the adjacent car of the train for controlling the supply of fluid under pressure to and the release of fluid under pressure from said valve device, a valve normally establishing communication through which fluid under pressure released from said valve device by said means flows, a movable abutment subject on one side to fluid under pressure for maintaining said valve in its normal position and operative upon the release of fluid under pressure for shifting said valve to close said communication and to establish another communication by passing said means and through which fluid under pressure is supplied to said valve device, a timing reservoir, a timing valve normally establishing communication through which fluid under pressure is supplied to said side of said abutment and to said timing reservoir and operative to establish a communication through which fluid under pressure is released from said reservoir and said side of said abutment, means operated by fluid under pressure supplied by said valve mechanism to operate said timing valve, and valve means operative manually for closing off the flow of fluid to said reservoir and said side of said abutment and for venting fluid under pressure from the reservoir and side of the abutment to effect the operation of said abutment and valve to render said means ineffective to control the operation of said valve device.

34. The combination in a train of at least two vehicles, of a brake equipment on one of said vehicles, means for initiating the operation of the equipment to effect an application of the brakes, means included in said equipment operative according to a relative movement between said vehicles to effect a regulated application of the brakes on the vehicle, means operative automatically at a predetermined time after the initiation of an application of the brakes to effect an application of the brakes without regulation by the second mentioned means, and means operative automatically upon the initiation of the application of the brakes for timing the action of the third mentioned means.

35. The combination in a train of at least two vehicles, of a brake equipment on one of said vehicles, means for initiating the operation of the equipment to effect an application of the brakes, means included in said equipment operative according to a relative movement between said vehicles to effect a regulated application of the brakes on the vehicle, means operative automatically at a predetermined time after the initiation of an application of the brakes to effect an application of the brakes without regulation by the second mentioned means, and fluid pressure responsive means operative upon the initiation of an application of the brakes for timing the action of the third mentioned means.

36. The combination in a train of at least two vehicles, of a brake equipment on one of said vehicles, means for initiating the operation of the equipment to effect an application of the brakes, means included in said equipment operative according to a relative movement between said vehicles to effect a regulated application of the brakes on the vehicle, fluid pressure responsive means operative at a predetermined time after the initiation of an application of the brakes to effect an application of the brakes without regulation by the second mentioned means, and fluid pressure responsive means operative upon the initiation of an application of the brakes for timing the operation of the third mentioned means.

CLYDE C. FARMER.